United States Patent
Sassi

(10) Patent No.: US 6,629,263 B1
(45) Date of Patent: Sep. 30, 2003

(54) FAULT TOLERANT NETWORK ELEMENT FOR A COMMON CHANNEL SIGNALING (CCS) SYSTEM

(75) Inventor: Abdessattar Sassi, Eybens (FR)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/425,698

(22) Filed: Oct. 22, 1999

(30) Foreign Application Priority Data

Nov. 10, 1998 (EP) .............................................. 98402814

(51) Int. Cl.[7] ................................................ H02H 3/05
(52) U.S. Cl. ............................................ 714/15; 714/4
(58) Field of Search ................................ 714/4, 15, 13, 714/11; 707/202

(56) References Cited

U.S. PATENT DOCUMENTS

| | | | | |
|---|---|---|---|---|
| 6,058,424 A | * | 5/2000 | Dixon et al. ................. | 709/226 |
| 6,134,673 A | * | 10/2000 | Chrabaszcz ................... | 714/13 |
| 6,205,449 B1 | * | 3/2001 | Rastogi et al. .............. | 707/202 |
| 6,247,141 B1 | * | 6/2001 | Holmberg ...................... | 714/2 |

OTHER PUBLICATIONS http://www.cisco.com/univercd/cc/td/doc/product/tel_pswt/vco_prod/ss7_fund/ss7fun03.pdf.*
http://www.protocols.com/pbook/tcpip.htm.*

* cited by examiner

*Primary Examiner*—Scott Baderman
*Assistant Examiner*—Joshua Lohn

(57) ABSTRACT

A fault tolerant CCS system has two similar peer systems, one being an active system and the other a standby system. Each peer system has a local application which runs therein and which has an access to a common database that is used for storing critical status and application information. Further, each peer system includes a protocol stack for handling the multiple dialogs comprising exchanges of messages between the application and a remote network element. The protocol stack is enhanced by a first function that allows the active application to request the protocol stack to provide the current status of a given dialog and by a second function that is issued by the standby application to re-initialize the standby protocol stack. The first function is used to regularly retrieve, for any dialog, the current state of its associated protocol stack state machine and to store the latter into the common database. Upon occurrence of a failure, the standby application can access the common database for retrieval of the current state data, as well as issue a command to re-initialize the standby protocol stack so that the ongoing dialog can resume.

9 Claims, 2 Drawing Sheets

FAULT TOLERANT NETWORK ELEMENT FOR A COMMON CHANNEL SIGNALING (CCS) SYSTEM

FIELD OF THE INVENTION

The invention relates to signaling systems in telecommunications and more particularly to network elements for a Common Channel Signaling system having fault tolerance capability.

BACKGROUND OF THE DESCRIPTION

The need for more and more services leads to the reorganization of telecommunication networks with a separation between the voice transmission functions and the signaling functions. In modern networks, based around the concept of Common-Channel Signaling (CCS), the information that is transported between the different exchanges forming parts of the networks, is conveyed on a dedicated separated signaling channel that is different from that used for the speech path. This separation occurs both within the Exchanges in the telecommunication networks and external to the Exchanges, thus allowing optimization of the control processes, the switch blocks and the signaling systems. CCS systems form a major part in the drive towards all-digital networks. Networks which offer end-to-end digital communications between customers are termed 'Integrated Services Digital Networks' (ISDN).

SS7 is now the reference in the definition of common channel signaling systems. General background information relevant to the systems and protocols which are involved in CCITT No 7, and more generally with CCS, be found in document 'Common-channel signaling' by R. Manterfield, Institution of Electrical Engineers, Telecommunications series 26, 1991. An example of implementation of a CCITT No 7 signaling network is found in the article *'The HP OpenCall SS7 Platform'* by Denis Pierrot et al, Hewlett Packard Journal, August 1997, p. 58–64.

The modern trend is to provide ISDNs and the ISDN User Part (ISUP) protocol is designed primarily to control the set-up and release of calls in such networks. Because of the flexible nature of the ISDNs, the supplementary services defined within the ISUP are more comprehensive, and use more advanced techniques than those that were originally designed for the analog telephone networks. The ISUP defines the messages and procedures for the control of switched services in ISDNs, whereby a communication is allowed between a local application and a remote network element. The ISUP covers both voice (e.g. telephony) and non-voice (e.g. circuit-switched data) applications. As telecommunication networks evolves towards ISDN, the ISUP will obviate the need for the previous Telephone User Part (TUP) and Data User Part (DUP).

Other protocols can be used for achieving high value services in signaling systems involving communication between an application located in a local network element and a remote network element. Such protocols may include Transaction Capabilities Application Part (TCAP) for controlling non-circuit-related information transfer between two or more signaling nodes in a signaling network, and Q931 for the establishing, maintaining, and clearing of network connections at the ISDN user-network interface.

As with other essential parts of the telecommunication networks, there is a need for reliability and security of the signaling systems in general and the protocol stack in particular. The protocol stack—whatever it is ISUP, TCAP or Q.931 must be robust and must allow an effective way of ensuring high reliability. Hence, when an ISUP connection is established, for instance, it is crucial to protect it until its processing completes.

SUMMARY OF THE INVENTION

It is an object of the present invention to provide a fault tolerant network element for a Common Channel Signaling system allowing a robust implementation of a telecommunication protocol stack responsible for the management of structured message exchanges (hereinafter referred to as dialogs) between the local application and remote network elements, such as an ISUP protocol stack, a Q.931 protocol stack or a TCAP protocol stack, and which allows the node to continue the on-going dialogs established between a local application and a remote network element despite the failure of one component in the local node.

This and other objects are achieved by the process and apparatus which are defined in the claims.

Basically the fault tolerant network element of the invention comprises two similar peer systems which are organized in a fault tolerant configuration, with a former operating as an active system and the latter standing in a standby configuration. Each peer system has a local application which runs therein and which has an access to a common highly available database that is used for storing application information. Further, each peer system includes a protocol stack, such as ISUP, Q.931 or TCAP for handling dialogs between the local application and remote network elements.

In accordance with the present invention the protocol stack is enhanced by two additional functions: a first Get_dialog_state( ) available for the local application to request the protocol stack to provide the current state of a given dialog; a Set_dialog_state( ) which is issued by the application to update the state of a given dialog in the protocol stack. The first function is used, at appropriate instants which are defined by the application, to regularly retrieve, for any dialog, the state of its associated protocol stack state machine. This allows the application to store the latter into the common database, together with its own critical information. An automatic failure detection mechanism is used in each peer system for detecting the occurrence of a failure and, in response to this detection, the application running in the backup peer system, which has access to the common database, can retrieve all the states of all on-going dialogs and, further, for each dialog, can issue a Set_dialog_state( ) to the local associated protocol stack so that the latter can be updated and can resume the dialog with the remote network element until its completion.

This arrangement results in substantial advantages. Firstly it is the application which decides at which instant the replication should occur, i.e. at which instants the Get_dialog_state( ) should be issued. The application keeps overall control of the replication operation. This allows the application to store in the database, for any on-going dialog, the protocol stack state and the related application data. This provides a consistent view to the peer application in the case of a failure. The application may decide that the Get_dialog_state( ) is used at some particular critical instants of the dialog, e.g. when the dialog is established and when the dialog is terminated. This avoids to increase the complexity of the protocol stack being considered, either ISUP, Q.931 or TCAP, and further permits the latter to be used in combination with a large variety of applications, where each application can choose a different policy for replicating the dialog states. In the invention, the application performs all database accesses and the protocol stack has no direct connection to the database.

Preferably, the database is an in-memory highly available database allowing rapid access by the application running in the respective active and backup system.

DESCRIPTION OF THE PREFERRED EMBODIMENT OF THE INVENTION

While the invention provides an effective fault tolerance mechanism for different protocol stacks, such as ISUP, TCAP or Q.931, the preferred embodiment of the invention will be particularly described with reference to ISUP, although it is not limited to the latter.

Figure 1:
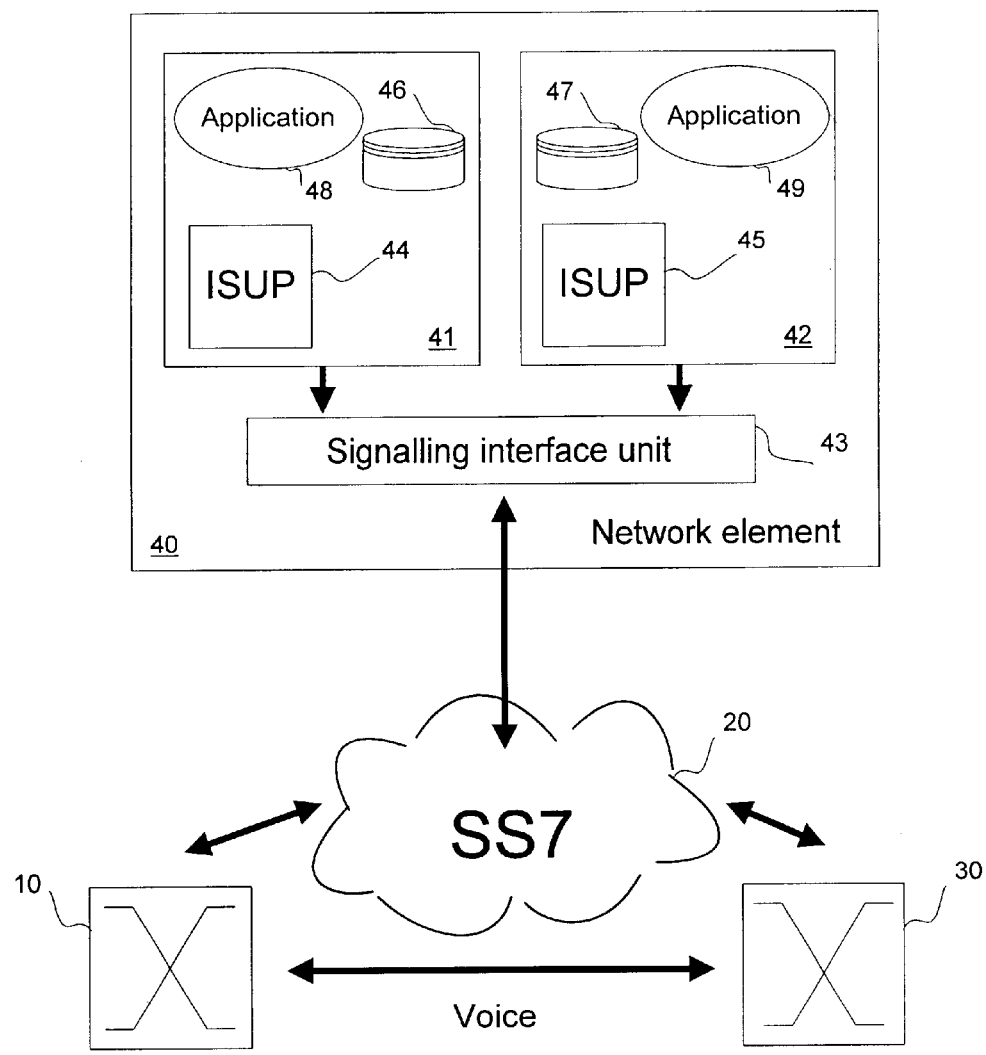
FIG. 1 illustrates an embodiment of the present invention in a SS7 telecommunication mode.

FIG. 1 illustrates the principle of the invention for an ISUP protocol stack. A telephone Exchange or Switch 10 communicates with a Network element 40 the purpose of which is to provide added-value services and/or to control access to a network resource (such as an Intelligent Peripheral or a Network Access server). Network element 40 will act as the destination for ISUP signaling messages, with the voice or media channel from switch 10 connecting directly to network resource 30. Network element 40 may or may not co-reside with network resource 30.

Generally speaking the protocol stack, whether it is ISUP, TCAP or Q.931, provides an Application Program Interface (API.) which is used by the application to send and receive the messages exchanged with the remote network element. In the preferred embodiment of the invention, the protocol stack and its API incorporate two additional specific functions that will be used for the replication mechanism of the invention. The concept of API. is well known to the skilled man and will not be further developed.

Network element 40 comprises two similar peer systems 41 and 42 which are associated in order to build a fault tolerance configuration. Either of the two peer systems can replace its associated element when the latter is subject to a failure. An additional set of shared hardware SS7 components forming the Signaling Interface Units (SIU) 43 are connected to both peer systems 41 and 42. Within the SS7 network 20 a unique Point Code (PC) identifier identifies each such Network element 40. In a preferred embodiment of the invention, the Systems 41 and 42 are HP 9000 computers manufactured by Hewlett Packard Company.

A voice line is used for the voice communication between Switch 10 and the network resource 30. The particular meaning of the messages that are being transferred via the signaling network are handled by the level 4 of the SS7 system, that is to say the ISDN User Part. which defines the formats and procedures involved in the Integrated Service Data Network (ISDN). When a switch wants to communicate with network resource 30, an ISUP dialog is generated on the signaling network for the purpose of managing all the signaling aspects for that connection. Switch 10 may wish to connect to network resource 30 as a result of an user initiated call (e.g. when the user has dialed the access number of a Network Access Server, for dial up internet access) or to interact with an user in order to offer a value added service (e.g. to collect a user's service preferences or personal identification details, such as collecting a credit card number, user Personal Identification Number (PIN) and destination phone number, in a credit card calling service).

The ISUP protocol starts with the transmission of an Initial Address Message (IAM) from switch 10 to Network element 40, which includes system 41 and 42. The IAM message is the first message to be sent during a call set-up. It includes the address digits that are dialed by the customer to route the call, as well as the Point Code (PC) of the network element required for processing the call. This IAM message is processed by means of an ISUP protocol stack responsible for verifying the correctness of the message and represented under the reference 44 and 45 for the systems 41 and 42 respectively. Additional processing steps are then performed by the specific application 48 being involved (credit card calls, personalized called forwarding Internet access control, etc . . . ). Application 48 will perform its own specific logic or database look-up and will generate the appropriate response to the switch.

In case of a credit card call for instance, the application 48 may exchange multiple messages with the switch via the ISUP protocol stack in order to request and verify the credit card details. This may also include a Release message from the switch to indicate the end of the call to allow the application to generate the appropriate billing record. Other applications include Internet access control characterized by a telephone number dispatched between access servers (or modem banks). In that case, the Release message permits the application to know that a modem is available so that the next calling person will be connected to the latter. The Release message also allows the application to generate the appropriate billing record for the terminated Internet connection.

The above mentioned examples illustrate the different steps and procedures of the ISUP dialog which must be protected when a failure occurs. The particular arrangement of the invention permits to protect the ISUP dialog from the failure of one of the two systems 41 and 42 during its lifetime.

When one failure occurs, the other system acts as a backup for the failing system, supersedes the latter and continues opened or on-going ISUP dialogs with the switch.

Generally, systems 41 and 42 have an access to one common database for storing information relating to on-going connections (the states of the considered ISUP protocol stack), and other critical information relating to the application, such as customers data. Best performance is achieved when the database is a highly available in-memory database providing fast access with separate copies of the database being kept in synchronism on the two systems, such as shown in FIG. 1. In that case, databases 46 and 47 are used for storing information relating to on-going connections, and all changes to database 46 in system 41 (for instance) are automatically propagated to system 42 and applied to database 47. A key aspect of this invention is that application 48 is responsible for identifying the information to be stored into the database 46 in a timely fashion, to ensure its propagation to database 47 (in the case of a dual database arrangement), and hence its availability on system 42 in the case of a failure on system 41. Application 48 can update information at key points in the call's lifecycle, for instance when the connection is requested, when the connection is established, and when the connection is terminated. This provides great flexibility since the application can control, in each case, the appropriate moment at which to retrieve the ISUP call state and to store it the database.

This may occur at different instants: The application may store the ISUP state machine for each new message being exchanged in the considered dialog, or only at the establishment or the termination of the dialog, and possibly at additional critical moments during the life of the dialog. For very short dialogs, the application may decide that it is not useful to store such information. For ISUP for instance, the application may decide to store the information in the database as soon as the voice-call is established and to remove the information from the database when the voice call is terminated.

This general control of the replication of the protocol stack state machine, which is given to the application, is an important advantage of the invention. It has been found to be much more effective than one replication process which would be directly performed between the two protocol stacks, and which would lead to a more complex protocol stack design. With the invention, the protocol stacks are not responsible for the replication process and it is the application that keeps the entire view over the replication process. In one process, the application may, with the invention, simultaneously store the given protocol stack machine state with its own critical information—e.g. a credit card number—in accordance with the degree of importance of the connection being considered.

To achieve the control of the replication of the ISUP protocol state by application 48, the protocol stack provides two additional functions or primitives. A first function permits the application to retrieve the current state of the ISUP protocol, on a per DPC/CIC basis. Particularly, instance 44 of the ISUP state machine on system 41 is designed to support a Get_dialog_state( ) method to return the current state of the ISUP protocol stack to application 48 upon request on the latter.

By invoking the first Get_dialog_state( ) method, regularly or at appropriate instants, application 48 can retrieve the state of the ISUP state machine corresponding to the DPC/CIC being considered, and then store the ISUP state current value together with the application state into database 46. The change brought to database 46 can then be propagated to database 47 on system 42. By these means, the invention ensures that the ISUP protocol state and the application information are simultaneously saved in the databases, and hence, after failure, database 47 on system 42 contains a consistent view of both the ISUP protocol state and the application state.

In case of a failure occurring in system 41, the invention involves an efficient switchover mechanism from failing system 41 to system 42. To achieve this, both system 41 and 42 are fitted with an appropriate failure detection mechanism to detect the occurrence of a failure in its peer system. Such mechanism can be based on a <<Heart beat detector>> for instance, or a <<watch dog>> that is used for determining whether or not each system 41 or 42 can still be considered operational. This is achieved by very simple messages that can be conveyed through the Local Area Network connecting the two systems 41 and 42. For instance, when system 42 considers that system 41 has failed due to the absence of the heart beat messages; system 42 takes control of the signaling interface unit. At the moment of the switchover, the ISUP protocol states on system 42 will be updated using the information held in the in-memory database 46 or 47. In addition to the above mentioned first method or routine, instance 45 of the ISUP protocol stack is designed to support a Set_dialog_state( ) method which permits application 49 to control the reset of the ISUP protocol state with the data which were loaded into database 47. Once all of the ISUP protocol state machines have been updated, system 42 can receive all of the ISUP messages from switch 10, including all the messages relating to on-going calls that were previously processed by the failed system.

Figure 2:
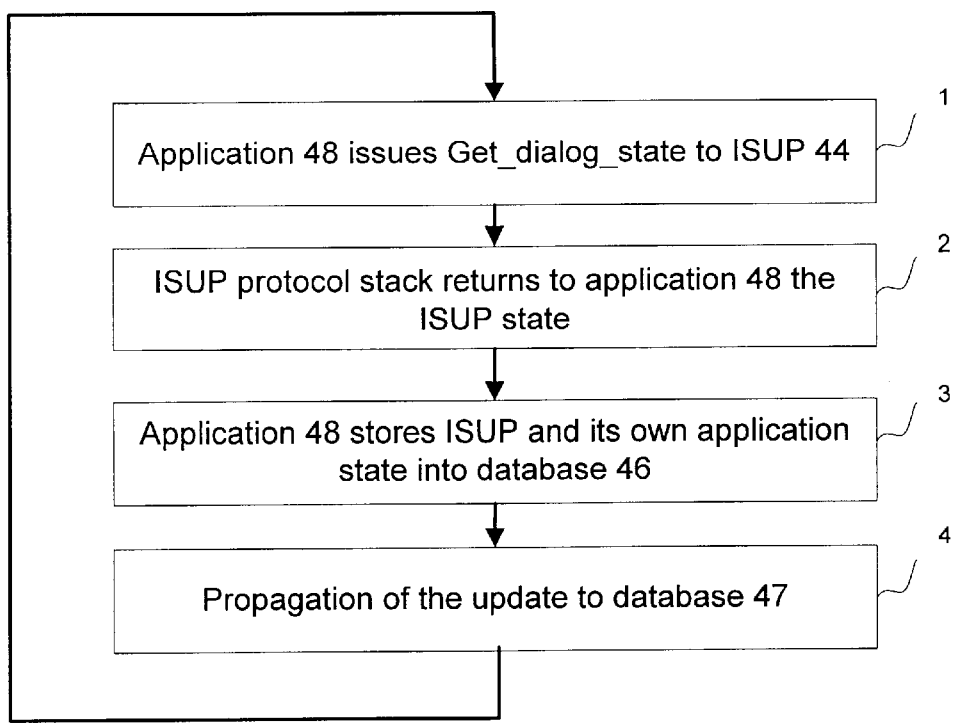
FIGS. 2 and 3 respectively illustrate the dynamic control flow of the replication and recovering process in accordance with the present invention.

FIG. 2 summarizes the dynamic flow chart of the different messages and functions, which are exchanged in the process according to the present invention. This involves a replication process and recovery process in response to a switchover.

The replication process is continuously performed with the succession of the three following steps:

In a first step, the application 48 issues, when appropriate, a Get_dialog_state( ) to ISUP stack 44 identifying a particular dialog characterized by DPC/CIC, as shown in arrow 1 in FIG. 2.

In response, represented by arrow 2, the ISUP protocol stack returns to application 48 the current state of that ISUP state machine. In one embodiment of the invention, a specific code is returned which represents the current state of the dialog.

In a third step—represented by arrow 3—application 48 stores ISUP machine state, together with its own critical data into the database 46. This storage is performed in a single step, and is automatically propagated to database 47 by any suitable mechanism (not shown) during an additional step 4.

The succession of the above four steps is continuously performed under control of the application 48 in order to achieve the replication of the ISUP state machine.

Figure 3:
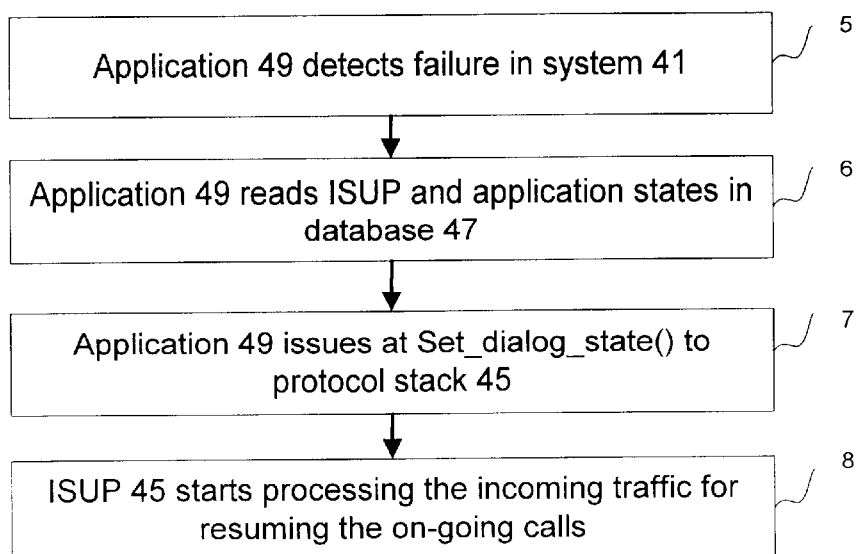

The recovery mechanism is initiated upon the detection of a failure occurring in system 41 for instance, as represented by arrow 5 in FIG. 3.

From that instant, as represented by arrow 6, application 49 performs a read operation in database 47 in order to retrieve simultaneously the application critical information as well as the ISUP state.

Then, as shown in reference to arrow 7, the application 49 issues a Set_dialog_state( ) to its associated protocol stack 45. The use of an in-memory database is important to ensure quick recovery of the protocol stack states.

When this recovery has been terminated for all established dialogs, the recovery process completes with the transmission of an authorization to the protocol stack 45 in order to start the processing of the incoming traffic, as represented by arrow 8.

This ensures an effective fault tolerance instance of the ISUP protocol stack.

While the invention has been particularly described on with respect to the ISUP protocol stack, it should be kept in mind that other protocol stacks may be adapted to incorporate the invention, and particularly to use the two Get_dialog_state( ) and Set_dialog_state( ) functions. Generally speaking a protocol stack manages specific dialogs, i.e. sequence of structured messages, that are exchanged between a local Application and remote network elements. In the case of ISUP for instance, the network element may be a switch, such as switch 30 in FIG. 1, and the sequence of messages is used for establishing or releasing a circuit etc . . . This is achieved by the provision of messages such as an Initial Address Message (IAM), an Answer Message (ANM) etc . . . In the case of TCAP for instance, one element corresponds to a transaction invoking a particular operation to be executed by the application, and the latter returns the result of the operation. TCAP dialogs includes messages such as TC_BEGIN; TC_CONTINUE; TC_END etc . . . The Q.931 protocol involves dialogs having messages such as; ALERTING; CALL PROCEEDING, CONNECT, etc . . . which are well known to the skilled man and will not be elaborated on.

Also, it should be kept in mind that the two functions or primitives that enhance the protocol stack, i.e. the Get_dialog_state( ) and Set_dialog_state( ) use identifiers for characterizing a given dialog, and which closely depend on the particular protocol stack being considered. For instance, in an ISUP protocol stack, the identifier is DPC/CIC number, while TCAP uses the user dialogue ID and the provider dialogue ID and Q.931 uses the Call ReferenceValue.

What is claimed is:

1. A fault tolerant network element for exchanging messages with a remote network element in a Common Channel Signaling (CCS) system, said fault tolerant network element comprising
   a first system including a first application providing added value services, a first protocol stack handling multiple dialogs comprising exchanges of said messages between said first application and said remote network element;
   a second system comprising a second application and a second protocol stack;
   said second system being arranged in a standby configuration to support a failure condition occurring on said first system;
   at least one database being accessible by said first application and said second application; and
   wherein said first and second protocol stacks each comprise:
      means for returning to its associated application the current state of a given one of said dialogs; and
      means for re-initializing the current state of the protocol stack with data provided by the associated application.

2. The fault tolerant network element in accordance with claim 1, wherein said first application comprises means for retrieving the current state of its associated protocol stack and storing the latter together with its own critical data into said at least one database.

3. The fault tolerant network element in accordance with claim 2, wherein said first system includes a failure detection mechanism for generating a failure condition to said second application, and that said second application includes:
   means for retrieving, for any given dialog, the protocol stack state and the application data stored in said at least one database; and
   means for issuing a command to said second protocol stack for re-initializing the latter with the protocol stack state retrieved from said database.

4. The fault tolerant network element in accordance with claim 3, wherein said at least one database comprises two databases which are respectively located in said first system and said second system and wherein each change brought to the former is automatically propagated to the latter.

5. The fault tolerant network element in accordance with claim 4 wherein said first or said second protocol stack is either an ISUP protocol stack, or a TCAP protocol stack or a Q.931 protocol stack.

6. The fault tolerant network element in accordance with claim 3 wherein said at least one database is an in-memory database for allowing fast access.

7. A process for achieving fault tolerance in a network element for a Common Channel Signaling (CCS) system, said network element comprising:
   a first system arranged in an active configuration having a first active application and a first protocol stack for handling multiple dialogs comprising exchanges of messages between said first application and remote network elements;
   a second system comprising a second application and a second protocol stack arranged in a standby configuration;
   at least one database accessed both by said first application and said second application;
   said process comprising the following steps of:
      issuing by said first application to said first protocol stack a command for returning to said first application a current protocol stack state of a given one of said dialogs;
      storing by said first application in said at least one database the returned state together with application related information;
      detecting the occurrence of a failure condition of said first system;
      retrieving by said second application said returned state of said given dialog stored in said at least one database;
      issuing by said second application to said second protocol stack a command to re-initialize said second protocol stack with said returned state of said given dialog retrieved from said database; and
      authorizing by said second application said second protocol stack to resume the handling of said given dialog.

8. The process according to claim 7, wherein said first or second protocol stack is a ISUP, a TCAP or a Q.931 protocol stack.

9. A fault tolerant network element for exchanging messages with a remote network element in a Common Channel Signaling (CCS) system, said fault tolerant network element comprising
   a first system including a first application providing added value services, a first protocol stack handling multiple dialogs comprising exchanges of said messages between said first application and said remote network element;
   a second system comprising a second application and a second protocol stack;
   said second system being arranged in a standby configuration to support a failure condition occurring on said first system;
   at least one database being accessible by said first application and said second application;
   wherein said first application comprises:
      means for issuing a command to said first protocol stack for returning/retrieving of a current state of a given one of said dialogs; and
      means for storing said returned current state of said given dialog in said at least one database; and
   wherein said second application comprises:
      means responsive to said failure condition occurring on said first system to retrieve said current state of said given dialog from said at least one database and to update said second protocol stack with said retrieved current state of said given dialog.

* * * * *